Sept. 27, 1966   C. G. MANN   3,275,987
PRODUCTION MONITORING SYSTEM
Filed May 15, 1961   4 Sheets-Sheet 1
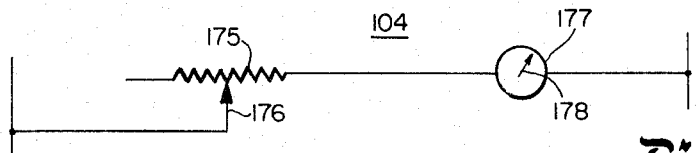
Fig. VI
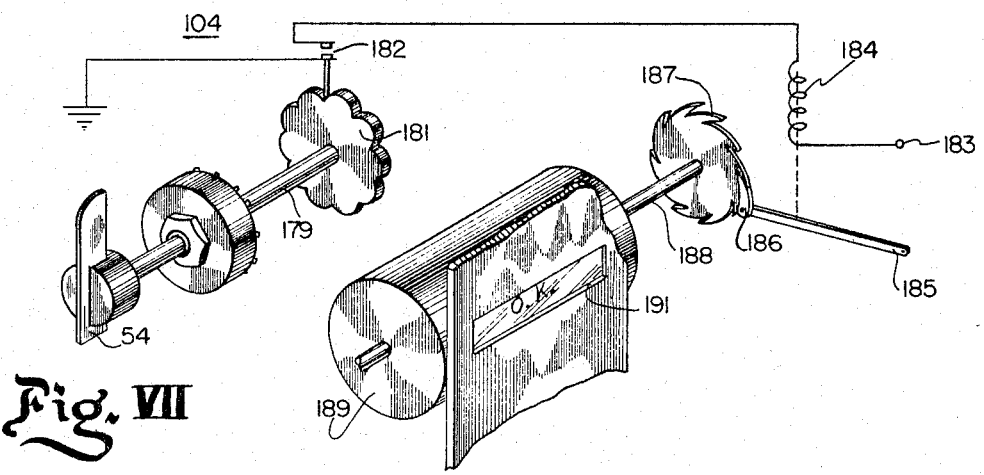
Fig. VII
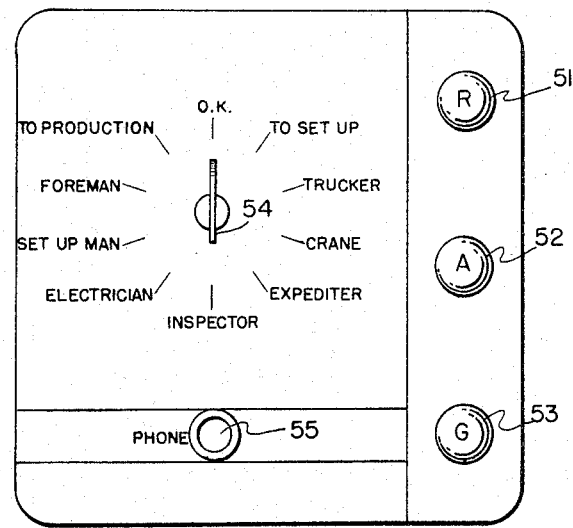
Fig. I
INVENTOR.
CHARLES G. MANN
BY Marshall + Wilson
ATTORNEYS Sept. 27, 1966 C. G. MANN 3,275,987
PRODUCTION MONITORING SYSTEM
Filed May 15, 1961 4 Sheets-Sheet 2
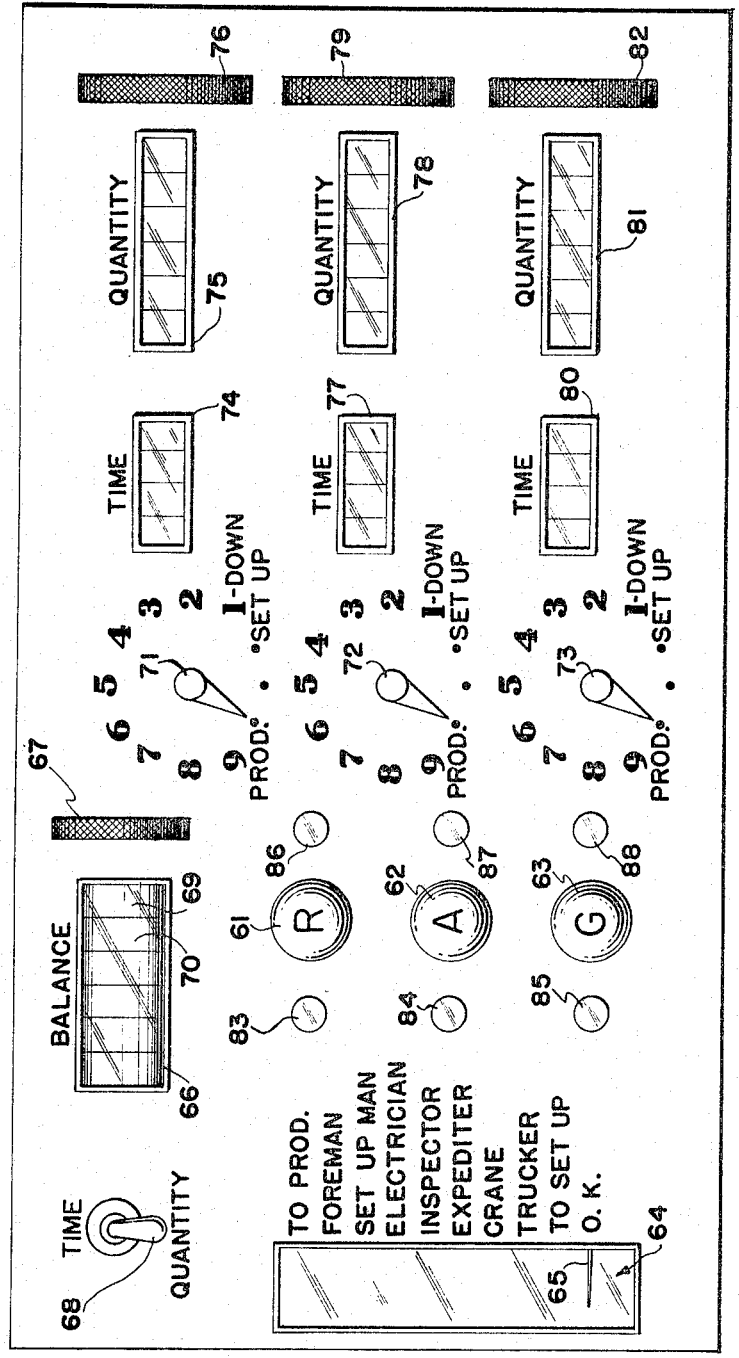
Fig. II
INVENTOR.
CHARLES G. MANN
BY Marshall + Wilson
ATTORNEYS

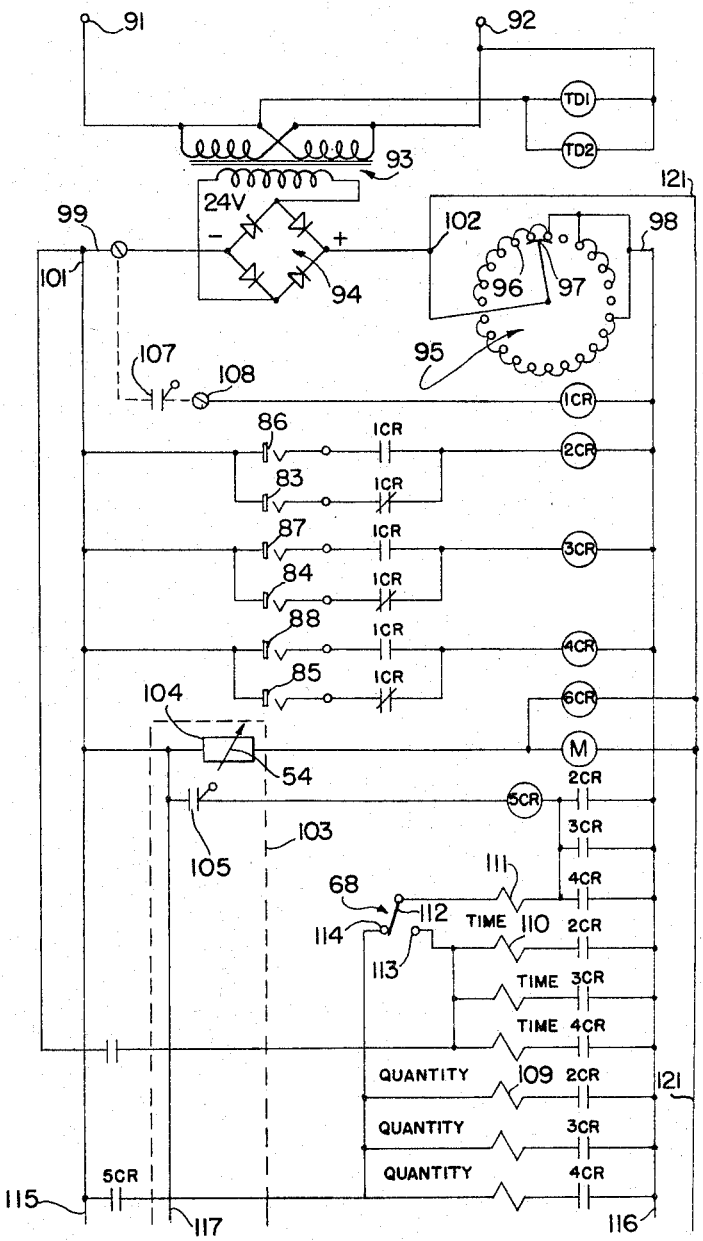
Fig. III
INVENTOR.
CHARLES G. MANN
BY Marshall + Wilson
ATTORNEYS

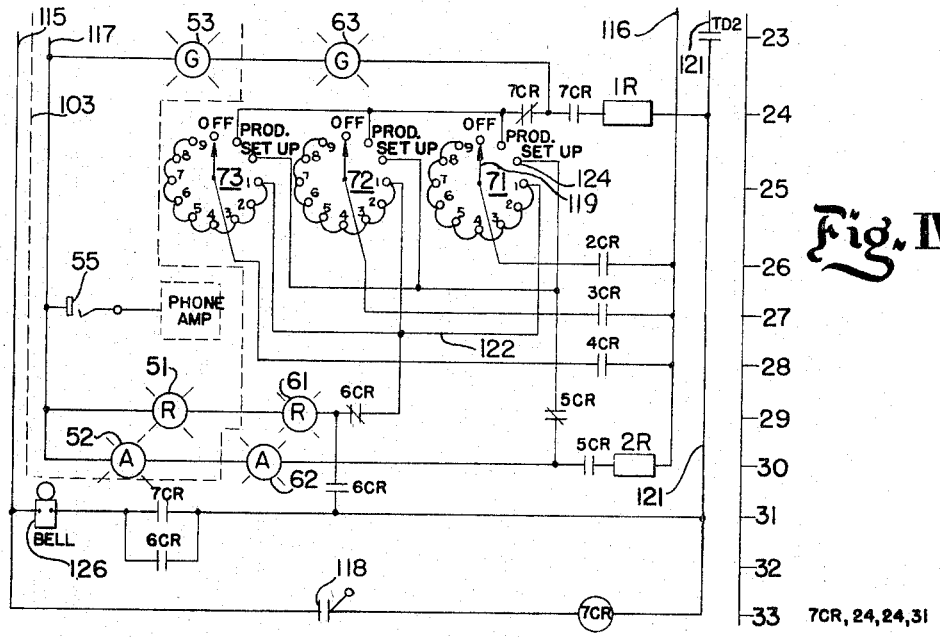
Fig. IV
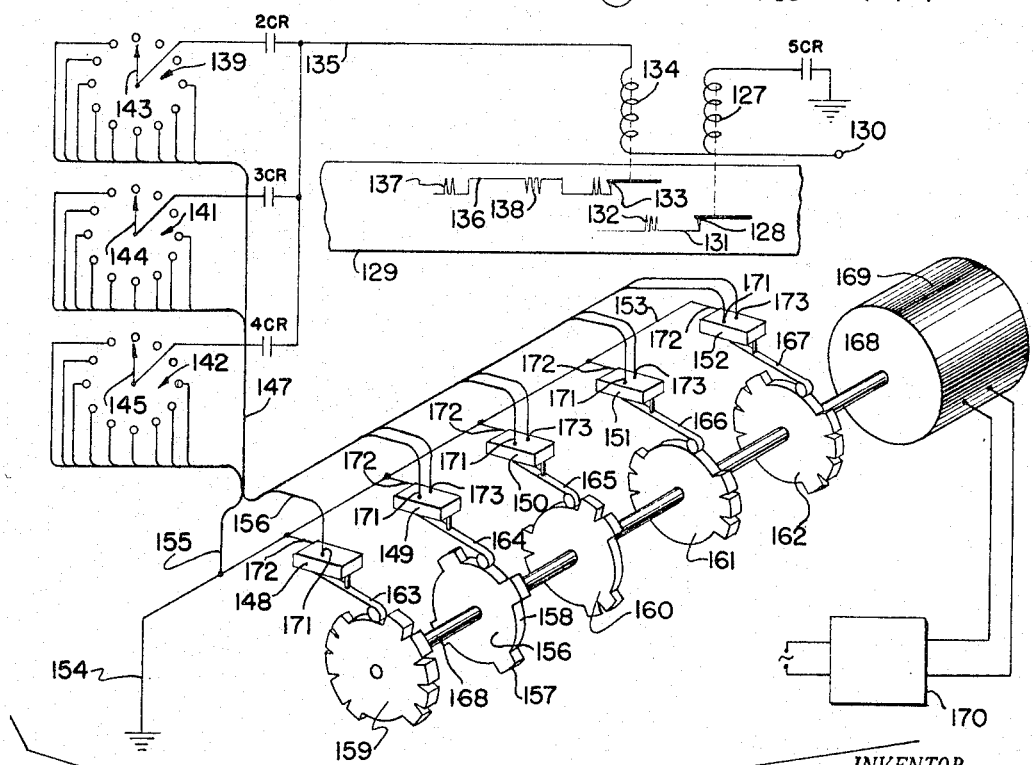
Fig. V
INVENTOR.
CHARLES G. MANN
BY Marshall + Wilson
ATTORNEYS

United States Patent Office 3,275,987
Patented Sept. 27, 1966

3,275,987
PRODUCTION MONITORING SYSTEM
Charles G. Mann, Farmington, Mich., assignor to Weltronic Company, Southfield, Mich., a corporation of Michigan
Filed May 15, 1961, Ser. No. 109,898
12 Claims. (Cl. 340—147)

This invention relates to a system for monitoring the utilization of production equipment particularly with respect to the number of productive operations of the equipment, the state of the equipment at all times during a working period and the intervals the equipment remains in the several states available to it.

Heretofore it has been known to apply counter mechanisms to production machinery at a work station in order to maintain a record of the number of operations performed by the equipment and in some instances it has been known to remove the counting operations from the equipment to a central station remote from the equipment in order that the count accumulated can be observed by supervisory personnel. Supplemental to the counting of operations performed at the work station, it has been known to provide inter-communicating means between the work station and the central station as, for example, by means of a telephone. In some instances efforts have been made to refine the production monitoring techniques by ascertaining the interval the machine at the work location is utilized on production and the interval the machine is on down time or subject to the setup operations. For example, a two-position switch can be provided at the work station which can be operated in one manner to issue a signal at the central station indicating that the machine should be in a production status and can be operated to a second position to indicate the need for aid at the work station. As a further adjunct to such a system a visual indication of the counting function can be afforded at the work station as by means of a lamp which flashes for each counting operation.

A principal object of the present invention is to improve and refine the production monitoring systems of the prior art. Another object is to simplify the equipment necessary to monitor operations at a work station and provide a remote indication of such operations.

A further object is to increase the flexibility of application of monitoring systems and to increase the useful information transmitted between work stations and central stations.

Another object is to automatically record the intervals the production equipment is maintained in its several states without impairing the indication of such states at a central station, to automatically record the productive operations of the machine, and to automatically record the reasons assigned for nonproductive intervals of the machine.

Advantageously, a plurality of work stations are monitored from a single central station and these several work stations can be provided with power from a common power supply and timed from a common timing means. The production equipment at each work station is arranged with a transducer which issues a characteristic electrical signal on each operation of the production equipment through a production cycle. This conveniently can be accomplished by a microswitch actuated by a cycling mechanical element of the equipment, a photo-electric sensing system or, in the case of an electrically actuated cycling mechanism, an electrical pickup element associated with the electrical control of the system. Each cycle-produced impulse is arranged to flash a lamp at the work station and a corresponding lamp in the central station to indicate to the production worker and the supervisor at the station that the monitoring equipment is functioning. The production cycles can be registered on conventional mechanical counters affording a visual display as an ascending or a descending count or both and can be employed to actuate recording mechanisms such as a pen recorder.

The work station is also provided with lamps which indicate the assignment of the machine by the supervisory personnel at the central station to production, set up, or down time. Corresponding visual indicators such as lamps are provided at the central station for the individual machines and the assigned status of the machine is recorded on permanent recording squipment. While the supervisory personnel exercises discretion in effecting the assignment of the machine to a given state, requests for such assignment can be made from the work station without requiring the production worker to depart therefrom as by means of a multi-position selector switch which transmits characteristic signals over a single pair of conductor to a selectively responsive indicator device at the central station for each machine. For example, if a setup man is desired at a work station, the production worker can position his call switch to the setup position and the supervisory personnel in the central station will be altered to the request of the production worker and his need. If the supervisory personnel in his discretion deems the need correctly evaluated, he can set equipment at the central station to correspond to the indicated need whereby the production worker's request is acknowledged at the work station by a suitable signaling system and the need is indicated in the recording mechanism. Advantageously, the period that this need prevails is also automatically recorded whereby the efficiency of the work station operation can be reviewed at any time in the future.

Programing of duplicate registers for time and operation cycles enables the work shifts to be segregated for registering or counting operations.

A record of the conditions or problems which cause a work station to be assigned to a down status is obtained by a cyclically operated encoder which issues pulse groups characteristic of those conditions or problems and by displaying a recorder pen according to the pulse groups. This affords a coded plot of the reasons on a time basis.

The exemplary system offering the above features indicates, registers and records work station status, operating cycles performed, elapsed time, cycles remaining to be performed, time remaining for performance and reasons assigned for placing a work station in a given status. While the work station attendant can convey information to and request changes in status from the central station, discretion remains in the personnel at the central station regarding the assignment of a work station to a given status and the recording of information. Efficient communication, supervision, and evaluation is therefore provided by the system.

One feature of this invention resides in providing a signaling mechanism at the work station of simple form which transmits a multiplicity of messages to the central station while maintaining discretion in the supervisory personnel at this central station to honor the request or refuse it.

Another feature resides in recording the production operations, the periods during which the machine is in its several states, and the reasons assigned for placing the machine in certain of those states, all automatically.

Another feature resides in means for signaling acknowledgment and approval of requests from a work station.

Additional objects and features of this invention will be more readily appreciated from the following detailed description when read with reference to the accompanying drawings in which:

FIG. I is a front view of a typical control panel provided at a work station;

FIG. II is a front view of the central station control panel, indicators, and the registering equipment for one work station;

FIG. III is a schematic wiring diagram in across-the-line form of a portiton of the system including the equipment at the work station and at the central station;

FIG. IV is a schematic diagram in across-the-line form of further circuits for the system including elements at the work station and at the central station;

FIG. V is a schematic diagram in across-the-line form of one form of permanent recording equipment operating in conjunction with the equipment of FIGS. III and IV;

FIG. VI is a detailed diagram of a first type of signaling system affording means for transmitting a multiplicity of selected messages from a work station to the central station; and FIG. VII is another form of signaling system for transmitting a multiplicity of messages from the work station to the central station.

In order to facilitate an understanding of the electrical functions which are performed by the equipment of this invention, the schematic circuit diagrams have been shown in across-the-line form. In such diagrams the actuating coils of relays and switches are not physically related to the contacts which they operate, but rather are shown in aligned relationship with the circuit elements with which they function. In order to correlate the contacts with their actuating coils, the circuits are divided into horizontal bands or zones which are numbered in accordance with a marginal index as shown on the right-hand side of the diagrams. The reference characters for any actuating coils falling within a given zone are listed in the column immediately to the right of the zone numbers in the marginal index and the line or zone locations of the contacts actuated by those coils are indicated in the column farthest to the right in the index. As a further aid in understanding the circuits, the marginal index identifies the nature of the contacts actuated by a coil. Thus, back or break contacts, those normally closed when an actuating coil is deenergized and opened when it is energized, have their line or zone location numbers underlined to distinguish them from front or make contacts, those which close when the actuating coils are energized.

When production is to be monitored at a work station and the conditions and activities at the work station are to be indicated at a central station, provisions must be made for transmitting a number of forms of information with equipment which is of as simple construction as is practical. The production equipment at a station can be considered as being in one of three states. The equipment can be on "production" so that it is conditioned to perform useful operating cycles, it can be on "set up" at which time the machine is being prepared for production, or it can be "down" or out of service. In order that production can be properly evaluated, the intervals any given work station remains in one of the three categories listed above should be indicated together with the number of operating cycles performed at each work station. Accordingly, counting means are usually provided which register each operating cycle of the production equipment. Ascending and descending counters also can advantageously be employed to record the number of production cycles performed by the equipment and the number of production cycles remaining to be performed to complete the job.

In some instances a piece of equipment is assigned to a particular status for a given interval and it is of interest to know the interval remaining for that assignment. For example three hours might be allocated for setup of dies at a work station and a descending time counter employed to set forth the portion of the allowed interval remaining. Accordingly, completion of a job can be considered to have been accomplished either by the production of the assigned number of operating cycles for the equipment or the expiration of the assigned production period for that equipment.

When a production interval has been completed, it is desirable to immediately inform both the operator at the work station and the supervisor at the central station that the machine is available for reassignment. Ordinarily the machine is then taken off production and as required is set up for another production task. Set up interval is also monitored and on occasion useful operating cycles of the machine can be performed during this interval. Accordingly, means are provided to count the operating cycles which are accomplished during the set up interval.

Messages indicating a number of requirements at the work station can be transmitted to the central station. While the manufacturing equipment is on production, presumably no messages need be sent. For example, during manufacture it may be necessary to call a trucker to the work station to convey completed pieces therefrom or to call a crane to the work station. The production worker may feel that an inspector should review the operation or that a foreman should be present. Similarly, when a machine is to be assigned to set up, this should be indicated to the central station and if a set up man is needed at the machine, this also should be indicated.

The control panel shown in FIG. I includes equipment for offering indications to workers assigned to the work station that the conditions at the work station are being properly indicated, registered and recorded at the central station and provides means for the assigned personnel to transmit standard messages to the central station so that help can be dispatched to the work station. Thus a group of three indicator lamps 51, 52 and 53 provide a visual indication of the state of the recording apparatus at the central station and the response of the supervisor or dispatcher at that station to the requests of the production worker at the work station. One advantageous arrangement has been to employ lamps of characteristic colors. Lamp 51, for example, can be red and can be arranged such that it burns steadily when the work station is on "down time." That is, when it is neither assigned to "production" or to "set up." It can be illuminated intermittently when the message transmitter at the work station has been operated from the "OK" position, thereby indicating that the equipment is functioning to draw the attention of the personnel at the central station to the message receiver for that work station. Lamp 52, which can, for example, be amber in color, is illuminated continuously to indicate that the job and personnel have been assigned to set up the work station. If lamp 52 is illuminated intermittently, it indicates that pieces are being produced. This function can occur while the equipment is assigned to "production" at which time lamp 53 is illuminated continuously. Further, since it is occasionally necessary to operate the equipment through manufacturing cycles while it is assigned to "set up" an intermittent flickering from bright to a dim state of lamp 52 indicates that an operating cycle has occurred for each dimming while the station is assigned to "set up."

Lamp 53 which continuously burns when the station is assigned to "production" can be green in color. It will be illuminated intermittently when the assigned number of operating cycles have been performed or the allotted interval of utilization of the work station has expired.

By virtue of the presence of the indicator lamps at the work station, the production worker is kept informed as to the operation of the monitoring equipment. Thus he knows that the work station is being credited with operating cycles for each dimming or flash of the amber lamp 52. Again he knows if his station has been assigned at the central station to one of the three categories of "production," "set up" or "down time."

A message transmitter in the form of a dial type selector 54 is made available to the production worker at the work station panel. The illustrated selector 54 has ten positions arrayed about the central axis at equal intervals.

This selector is employed to inform the dispatcher or supervisor at the central station regarding conditions at the work station and accordingly the nature of the messages available for transmission should be selected in accordance with the needs of the particular plant and work station. For purpose of illustration a ten-position selector has been shown for transmission of the following messages: the position in which the pointer is oriented vertically is the no trouble or off position for the transmitter; the remaining nine positions in clockwise order around the axis of indicator arm 54 include a first position which transmits a request that the work station be assigned "to set up," a second position that requests a "trucker," a third position calling for a "crane," a fourth position calling for an "expediter," a fifth position calling for an "inspector," a sixth position calling for an "electrician," a seventh position calling for a "set up man," an eighth position calling for a "foreman" and a ninth position requesting that the work station be assigned "to production." In addition, inter-communication between the work station and the central station or other portions of the plant can be facilitated by a phone connection from the work station panel and a phone jack 55 is illustrated as a means of providing such connection.

FIG. II shows a control panel at the central station typical of that provided for indicating conditions at each work station supervised or monitored from the central station. The counterpart of the equipment on the work station panel is located on the control station panel of FIG. II together with counters which register time and quantity and switches which enable the dispatcher or supervisor at the central station to exercise discretion with respect to the assignment and recording performed in response to information received from the work station. In addition, the central station panel includes duplicate registers of time and operating cycles enabling the utilization of the equipment at a work station to be registered for individual shifts of the work day. Provision for recording three shifts is made in the equipment illustrated.

Registration of "time" and "quantity" on a selected set of the time and operating cycle counters is controlled by a master programming clock together with selector switches which can be in the form of jacks accommodated by plugs on the face of the panel. Two jacks are provided for each registering and assignment selector deck. Each jack is activated by a programming clock at predetermined times so that if plugged it will cause its respective deck to register. Three recorder decks are shown. While it is to be appreciated that in some operations only one deck might be utilized in a single shift operation, where two shifts are performed, it is desirable to have individual shift records.

Lamps 61, 62 and 63 correspond in their functions to lamps 51, 52 and 53 at the work station panel. Accordingly, these lamps may be provided with the same color code wherein lamp 61 is red, lamp 62 is amber, and lamp 63 is green and the corresponding continuous and intermittent illumination is employed to signify the conditions discussed with respect to lamps 51, 52 and 53. As will be more fully discussed below, the message receiver or indicator 64 responsive to the message transmitter or selector 54 at the work station can be in several forms. In the illustration of FIG. II, it comprises a galvanometer type of meter having an indicator arm 65 which is displaced along a scale in accordance with the setting of the selector arm 54 with designations on the scale corresponding to the designations for the several positions of the selector arm at the work station.

A descending counter dial 66 is provided with a reset wheel or other reset mechanism 67 for setting the counter to the value to be counted. For example, if five thousand machine operations are desired on the run being monitored, this counter should be set to 5000. As the cycles are performed the count reduces. The counter has a second function of registering the remaining interval of time the work station is assigned to a given status. When used on a time basis the counter is set to the total number of time units assigned to the work station and as time expires the counter reduces the number indication always showing the amount of time remaining for the assigned interval. Since the counter dial 66 has an alternative function as either a quantity or time indicator, a selecting means for establishing which form of information will be counted is provided as a toggle switch 68 which when thrown to the upward position will cause the balance counter dial 66 to register in descending order the assigned interval for the work station and when thrown to the lower position will cause it to register the number of operating cycles remaining to be performed on the given assignment.

Inasmuch as the balance counter 66 and the remaining dial type counters to be discussed are of conventional nature wherein an impulse applied to a stepping coil causes advance in the count of one, such counters are not shown in detail although their operating coils are shown in the circuits of FIGS. III and IV, as will be described below. These counters or registers are of the decade type wherein the units decade wheel 69 is driven as by an electromagnetically actuated ratchet through ten steps to complete a cycle. During that cycle digits 0 through 9 are displayed at the panel face. Upon completion of a cycle a ratchet coupling to the next higher decade wheel 70 advances that wheel one position. Similarly higher order wheels are driven by the recycling of the next lower order. Reset wheel 67 when rotated drives a shaft coaxial with the register or counter wheels to pick up those wheels and carry them to a position exposing like digits. Ordinarily a detent is provided at the fully reset position where a counter reads zero and in the case of the balance counter the reset position displays the digit one for each wheel.

Response to the machine operator's indication of production problems or a change in state at the work station is made by means of selector switches individually applicable to the several shifts which can be accommodated in the registering system. Thus, if the upper deck of registering apparatus is effective, the dispatcher or supervisor at the central control station can acknowledge an operator's request as indicated on the message indicator 64 by setting his selection dial 71 to the corresponding position. Such a setting transfers the machine from "production" to either "set up" or "down time" and can be arranged to actuate recorders which periodically record the reasons the machine is assigned to "down time" so that a permanent record is maintained. Dial selectors 72 and 73 are provided for each of the registering decks in order that such selection can be made individual to each shift or, if so programmed, individual to a predetermined time interval or predetermined condition (e.g. down time), or additional condition at the same time.

A dial type indicator or counter 74 is periodically stepped to record the length of time that the work station is on the corresponding shift as by means of pulses derived from the master control. Each production cycle of the equipment at the work station applies a pulse to the dial type register or counter 75 to indicate the number of manufacturing operations which have been performed and are assignable to the corresponding shift. Both of the registers 74 and 75 are coaxial with a common reset shaft which can be reset by means of a reset wheel 76 or the like available from the face of the control panel. Similar time and cycle registers 77 and 78 for the second deck and 80 and 81 for the third deck are provided whereby second and third shifts or second shifts and the total of the two shifts can be recorded. Each deck is provided with a reset wheel 79 and 82 for the cycle register.

In order to enable the monitoring equipment to segregate the time spent and production accomplished on the several working shifts at the work station, an automatic or manually controlled programming means can be provided wherein the various register decks are rendered effective as selectively controlled by the dispatcher or supervisor at the central control station. This selection is accomplished through the use of plug actuated switches or connections. During one shift the column of jacks 83, 84 and 85 to the left of the indicator lamps are activated by the programming means during the assigned working interval and during the following shift the column of jacks 86, 87 and 88 to the right of the indicator lamps are activated. When the programmer renders jacks 83, 84 and 85 effective, the top, middle or bottom deck of registers can be activated by inserting a plug in the jack for the deck to be employed in monitoring that shift. Thus, the insertion of a plug in the jack 83 would render time register 74 and cycle register 75 effective, while a plug inserted in jack 84 would render time register 77 and cycle register 78 effective. Similarly, when the programmer has activated jacks 86, 87 and 88, the insertion of a plug in the uppermost jack will make the uppermost registers effective, while a plug in the center jack makes the middle registers effective, and a plug in the lower jack 88 makes the lower registers effective. One means of using this combination is to insert one plug in the left-hand column of jacks as, for example, the jack 83 so that the uppermost deck of registers is effective for the first shift to insert another plug in the middle jack of the right-hand column of jacks at 87 to render the middle deck of registers effective for the second shift and to insert plugs in both of the lowermost jacks 85 and 88 so that the lowermost registers are effective at all times and register the total time and total operations for the intervals the work station is assigned to production.

In FIG. III power is supplied from a suitable source such as 110 volt A.C. to the terminals 91 and 92 to the primary windings of a transformer 93, the secondary of which supplies a rectifier bridge 94. Timers TD1 and TD2 are also supplied from the source connected to terminals 91 and 92 as shown at 1 and 2. Timer TD1 closes a contact at 19 once every thirty-six seconds in the example in order to provide one-hundred closures per hour. This is provided by a suitable motor driven circuit which may be of the synchronous clock type. Timer TR2, which also may be a synchronous clock type of timer, makes and breaks a contact at line 23 once each second. Alternative timer devices performing these functions are available. The specific form of the devices operating these timers is not considered a portion of the present invention and therefore has not been disclosed in detail.

Programming of the operation of the system is performed by the multi-terminal switch 95 having a plurality of contacts 96 engaged by a brush 97 which is advanced clockwise on a time basis to close circuits as selectively set up by the inter-connection of the contacts 96 to lead 98 whereby provision can be made for monitoring the operation at work stations only during assigned work periods. Switch 95 permits timing to be interrupted during the transfer between shifts or at coffee breaks and meal breaks. While the programmer 95 has been shown with but three intervals it is to be understood that any number of intervals might be set up to accommodate the period covered by the programmer. Thus, the programmer might be on a twenty-four hour basis in which a work period from 7:30 p.m. to 9:40 p.m. was measured, followed by a ten-minute coffee break to 9:50. Another work period from 9:50 to 12:00, a one-half hour lunch break till 12:30 and an afternoon work period of from 12:30 until 3:30. If a multiplicity of shifts are involved, and the programmer is on a twenty-four hour basis, additional breaks between shifts and coffee and meal breaks during subsequent shifts are also provided for. Power therefore is applied to the element of the system at the lead 98 periodically in accordance with the assigned work periods and the registers and recorders are effective only during the period of applied power.

The equipment for the individual work stations including the call mechanism located at the work station, the receiver M at the central station, the indicator lamps 51, 52, 53, 61, 62 and 63, and the alarm bell 126 derive their power at the junctions 101 and 102 so that they are continuously effective. The work station equipment is represented as embraced in the dash lines making up rectangle 103. It comprises the message transmitter element 104 at 13 driven by the selector arm 54, a microswitch 105 or equivalent element for signifying the cycling of the manufacturing equipment at the work station as shown at 14 and energized through programmer 95, a green lamp 53 as shown at 23, a phone jack 55 as shown at 27, a red lamp 51 as shown at 29, and an amber lamp 52, as shown at 30. The remainder of the elements shown in FIGS. III and IV are located either on the control panel or within the control chassis at the central station and are interconnected with the elements at the work station by suitable cabling represented by the conductors illustrated.

Shift jacks 83 through 88 appear at lines 7 through 12. One or more of these jacks is provided with a plug to assign the digit registering and assignment functions to the appropriate deck of registers for any given program. Programming is effected through the operation of relay 1CR at 6 by means of program clock contact 107 at 6. The conductor to contact 107 has been shown dashed to signify that it extends from a clock which is common to the monitoring systems for several work stations and is connected to each monitoring system at the junction 108. Contact 107 is closed during the interval corresponding to one shift and open during the interval of another shift such that the relay 1CR is energized throughout the first shift and deenergized throughout the second. If three shifts are monitored, it is closed for alternate shifts. While energized, relay 1CR closes its front contacts at lines 7, 9 and 11 so that each of jacks 86, 87 and 88 are effective when a plug is inserted therein to complete circuits for their respective shift relays 2CR at 7, 3CR at 9, and 4CR at 11. During the program interval 1CR is deenergized, its back contacts are closed at 8, 10 and 12 so that jacks 83, 84 and 85 are responsive to the presence of jacks to actuate the shift relays 2CR, 3CR and 4CR. For example, with a plug in jack 86, and the program contact 107 closed so that relay 1CR is energized, shift relay 2CR will be energized to activate the uppermost deck of registers as shown in FIG. II so that the time register 74 and cycle register 75 will function.

When any shift relay is energized, it closes a contact in the circuit to the work station cycle relay 5CR so that that relay operates for each operating cycle at the work station which causes the closure of the cycle sensing switch 105 at 14. As noted above, the registers are actuated by coils which are pulsed for each operation to be registered. Thus, the time registers are pulsed at given intervals so long as they are effective and the cycle registers are pulsed for each operating cycle at the work station.

In the assumed case with the relay 2CR energized, its contact at 20 is closed so that each operation of relay 5CR in response to an operating cycle at the work station closes contact 5CR at 22 to energize quantity register, stepping coil 109 at 20 through the closed contact 2CR and advance quantity register 75 one step.

Every one one-hundredth of an hour the operation of timer TD1 at line 1 closes its contact at line 19 to energize time coil 110 through closed contact 2CR at 17 and advance time register 74 one step.

As noted with respect to FIG. II, balance register 66 is arranged to be responsive either to time or quantity. Its driving coil 111 shown at 16 can be selectively energized through the contact TD1 at 19 when toggle switch 68 is thrown so that its movable contact 112 engages contact 113 to place coil 111 in parallel with coil 110. Conversely, when the toggle switch 68 is thrown so that its contact 112 engages contact 114, coil 111 is placed in parallel with coil 109 and the balance register responds to operating cycles. The balance register coil is responsive when any of the three shift relays 2CR and 3CR or 4CR is energized to close the contacts at 14, 15 and 16, respectively.

In a manner similar to that above defined, the other decks of registers will be actuated if plugs are inserted in the jacks 87 or 88 at 9 and 11, respectively, to energize relay 3CR or 4CR and close their contacts at 18 and 21 or 19 and 22.

When the program switch 107 at 6 is open and the relay 1CR is dropped out, the operations of the time and quantity registers and the balance register will be effected selectively depending upon which, if any, of jacks 83, 84 and 85 are provided with plugs.

Main power leads 115 and 116 and common work station lead 117 supply power to the circuits of FIG. IV whereby the several visual and audio indicators and the assignment switches at the control station are made effective. Relay 7CR at 33 is energized at the termination of the job assignment at the work station as indicated on either a time or quantity basis through the balance register 66 when that register counts out through zero and turns in a descending order to a condition where only a series of the digit 9 appear. Under those conditions, the contact 118 at 33 is closed to issue both audible and visual warnings at the work station and in the central supervisory station. Multiposition switches 71, 72 and 73 for the upper, middle and lower decks of digit registers are shown at line 25. Again referring to the example in which the shift relay 2CR is energized, contact 2CR at 26 is closed so that if the contactor 119 of switch 71 is positioned on the "production" contact, lamps 53 and 63 at the work station and central control station respectively will be continuously illuminated through normally closed contact 7CR at 24 and closed front contact 2CR at 26. However, when the assignment has been terminated as indicated by the operation of the balance register to close the contact 118 at 33 and energize relay 7CR, back contact 7CR is opened and front contact 7CR at 24 is closed to complete the energizing circuit for lamps 53 and 63 through the resistance 1R and thence through periodically open and closed contact TD2 at 23 of the timer TD2 at 2. Timer TD2 has a one-second operating cycle. Thus, at the end of a production assignment, the green lamp at both the work station and the central station flashes on and off at one second intervals.

An audible signal is issued by bell 126 at 31 when the balance counter has counted out to close contact 118 and energize relay 7CR so that contact 7CR at 31 is closed.

At any time power is applied at junctions 101 and 102 and the message transmitter at the work station is displaced from its off condition, the message receiver designated as M at 13 and corresponding to receiver 64 in FIG. II, is actuated and a relay 6CR at 12 is energized. Thus a message can be transmitted from the work station and can be responded to at the central station when the programmer 95 has deenergized the remainder of the system. Relay 6CR thereby functions as a trouble indicator and is energized whenever an indication of trouble is made at the work station. Energization of 6CR opens its back contact at line 29 and closes its front contact at 31. This causes intermittent illumination of the red lamps 51 and 61 at the work station and central control, respectively, by the energization of those lamps from lead 117 through closed contact 6CR at 31, lead 121 and intermittently open and closed timer control contact TD2 at 23, to main power lead 116. If the supervisor or dispatcher at the central station acknowledges the trouble indication by repositioning the contact arm on whichever of those selector switches 71, 72 and 73, which are effective to assign the work station to down time, lamps 61 and 51 are continuously illuminated provided the operator at the work station acknowledges the response of the personnel at the central station by repositioning his trouble indicator selector 54 to the "OK" position. Return of message transmitter selector 54 to the "OK" position drops the relay 6CR to reopen its contact at 31 and close its contact at 29. This creates a circuit through the selector switch 71 as follows: from lead 117 through the lamps 51 and 61 and contact 6CR at 29, lead 122 to the interconnected terminals 1 through 9 of selector switch 71, contactor 119 which has been repositioned to one of those terminals by the supervisor or dispatcher at the control station in assigning the work station to "down time," and thence through closed contact 2CR to the main power lead 116.

When the dispatcher or supervisor at the central control station assigns a work station to set up, he sets the effective selector switch 71, 72 or 73 to the set up position as by positioning the contactor 119 on contact 124. This causes continuous illumination of the amber lamps 52 and 62 at the work station and the central station by continuously energizing those lamps from lead 117 through normally closed contact 5CR at 29, contacts 124 and 119 of selector switch 69, and closed contact 2CR at 26 to main power lead 116.

Operation of the machinery at the work station through a production cycle such that the cyle contact 105 is closed at 14 energizes relay 5CR to close its contact at line 30 causes the amber lamps to blink for each cycle. Since work station can be operated through production cycles, while the station is assigned to "set up," it is desirable to register and record those cycles also. This is accomplished by the momentary dimming of the amber lamps from their full brilliance signifying "set up" each time a cycle is completed. The cycle relay 5CR closes the contact at line 30 and opens the back contact at line 29 so that the lamps 52 and 62 are transferred from a connection directly across the leads 117 and 116 to a connection between those leads through a dimming resistance 2R. In order to audibly call the attention of the dispatcher or supervisor in the central control station to the control panel for a given work station, a bell 126, at line 31 is provided. This bell is energized when the message transmitter or trouble indicator relay 6CR is energized to close its contact at line 32.

While the system disclosed in FIGS. III and IV enables the operation at a work station to be monitored remotely, the digit registers do not provide a permanent record of the monitored conditions nor does the trouble indicator keep track of the reasons for placing the work station on down time. Ordinarily the readings in the registers are observed and entered manually on a log. An automatically kept permanent record of such information is frequently desirable. The circuits shown in FIG. V provide such a record through a conventional double pen recorder operating on a paper tape 129. This recorder is arranged to maintain a written record of the number of operating cycles performed at the work station, the assigned status of the machine and the reasons for that status or operating condition. Pieces produced are recorded as pips on a continuous line trace 131 by the closure of contact 5CR to complete an energizing circuit from a source of suitable power connected at terminal 130 through an actuating coil 127 for pen 128 to the 5CR contact and thence to ground. A typical trace for the recorder is shown on tape 129 at 131 in which each pip 132 represents an operating cycle. Details of the structure of the recorder are not disclosed herein inasmuch as a conventional commercial double pen recorder can be utilized for these purposes.

The second pen 133 is actuated by a coil 134 also connected between the suitable source of power at terminal 130 and a selectively established ground on lead 135. The trace 136 recording the machine condition can be permanently displaced as when the coil is energized to indicate one status (e.g. "set up") and permanently displace to the position where the coil 34 is deenergized to indicate another status (e.g. "production"). The remaining information regarding the reasons the work station is assigned to "down time" can be indicated by displacement from the on and off base lines. Since the illustrative embodiment requires recording nine reasons of "down time," nine codes must be established. This is accomplished by utilizing four codes comprising code groups of pips issued periodically and displaced from the off position of the pen and five code groups of pips periodically dislaced from the on position of the pen. These code groups are created by holding the pen in the off position through deenergized pen coil 134 and pulsing that coil to displace the pen to the on position to produce pips 137 in accordance with the desired code grouping, or conversely, to hold the pen in the displaced or on position by maintaining the coil energized and deenergizing the coil to permit the pen to return to its off position momentarily to produce pips 138 in accordance with interruption pulses arranged in code groups. Coding is effected through selection switches which may be second decks of the switches 71, 72 and 73 of FIG. IV, as switch decks 139, 141 and 142. Each deck is provided with a twelve-position tap switch having contacts at the same relative positions as the taps on the decks 71, 72 and 73, and a movable contact arm 143, 144 or 145. No coding is to be performed when the switch is moved to the "off" position, as indicated on the face of the central control panel or to the "production" position hence the contacts at these positions have no connections to external circuits. However, a characteristic trace on the paper tape record should be made for the interval the work station is on "set up" and for the several reasons assigned for "down time." Thus, ten of the taps on the tap switches are connected in multiple through cable 147 to suitable sources of coding pulses.

Completion of the energizing circuit for the pen coil 134 through a given tap switch 143, 144 or 145 is accomplished by the shift relays by means of their contacts 2CR, 3CR and 4CR. Each of these contacts selectively connect the movable contact 143, 144 or 145 of one of the tap switches to the coil whereby the orientation of that movable contact with respect to the taps connected to the cable 147 determines the actuating electrical pulses imposed on coil 134.

Encoding pulses are generated by five cam-actuated micro-switches 148, 149, 150, 151 and 152. Each of the micro-switches is provided with a common conductor 153 connected to ground through lead 154 and one of the taps for each of the switches is also connected permanently to ground through lead 155. For example, the tap corresponding to set up assignment for the work station can be so connected so that the pen 133 is permanently displaced to the coil energized position on its trace when the work station is assigned to set up. The nine remaining indications of the status of the equipment at the work station are encoded through five micro-switches by utilizing switches having a normally open and a normally closed contact whereby the normally open contact is closed to the common terminal when the micro-switch arm is displaced and the normally closed contact which is connected to the common terminal is disconnected therefrom when the micro-switch arm is displaced.

This encoding is accomplished by means of a suitably arranged cam such as 156 having alternate crests 157 and valleys 158 over its micro-switch actuating surface. The grouped crests 157 of the cams are separated by valleys affording an interval sufficient to exceed the normal interval between individual crests of a group to define code groups from individual pulses. The five cams 159, 156, 160, 161 and 162 actuate micro-switches 148, 149, 150, 151 and 152 respectively through their arms 163, 164, 165, 166 and 167.

The encoding cams for the five micro-switches are mounted on a common shaft 168 driven by a non-synchronous motor 169, the speed of which is controlled through a speed regulator 170. Each cam wheel when rotated through a revolution gives a plurality of code groups through the operation of its associated micro-switch in displacing the follower arm as it rides upon the cam crests 157 to move its plunger upward so that the terminal 171 normally connected to common terminal 172 is disconnected therefrom and terminal 173 normally disconnected from common terminal 172 is connected thereto.

One code which can be made up with the illustrated system is tabulated below with the encoding micro-switch, the code group and the reason for assignments to "down" status:

| Reason | Code | Switch | Terminal |
|---|---|---|---|
| Message #1 | One off pulse | 149 | 171 |
| Trucker | Two off pulses | 150 | 171 |
| Crane | Three off pulses | 151 | 171 |
| Expediter | Four off pulses | 152 | 171 |
| Inspector | Five off pulses | 148 | 171 |
| Electrician | One on pulse | 149 | 173 |
| Set-up man | Two on pulses | 150 | 173 |
| Foreman | Three on pulses | 151 | 173 |
| Message #9 | Four on pulses | 152 | 173 |

FIG. VI illustrates the detail of one form of message receiver in the form of a metering device M represented schematically at 13 of FIG. III. In that arrangement the transmitter at the work station for indicating the desired status to which the work station should be assigned and the reason for the assignment comprises a rheostat corresponding to the element 104 including a resistor 175 engaged by an adjustable brush 176 coupled to the adjusting arm 54. When the brush 176 is displaced to the left and off of the resistor 175 the status indicator is in the off position and the meter 177 corresponding to the element M at 13 of FIG. III positions its arm 178 against a stop which is labeled the off or OK position. As the brush 176 is displaced to the right on the resistor 175 reducing the resistance in series with the meter, the displacement of the meter arm 178 is increased proportionately across a calibrated scale which is correlated with the scale for the arm 54 at the work station. Thus, if the arm 54 at the work station is displaced to the fourth position illustrated as the call for a crane the meter arm 178 will also be displaced to a fourth position marked "crane" and the dispatcher or supervisor at the central station will be immediately informed of the needs at the work station.

Another form of indicator is shown in FIG. VII wherein the arm 54 of the transmitter element 104 is coupled to a shaft 179 driving a cam 181 which for each transfer of positions closes a pair of contacts 182 once, thereby applying a pulse of energy from a suitable source at terminal 183 through an actuating or stepping coil 184 to ground. Stepping coil 184 displaces an armature 185 bearing a pawl 186 and steps a ratchet wheel 187 which drives a shaft 188 bearing a cylinder 189 upon which the various states provided for at the control station are labeled. This cylinder positions the legends in registry with a window 191 on the control panel for the work station located at the central station such that only one status indication is revealed at any given time. Thus, the displacement of the arm 54 at the work station to the fourth position "crane" generates four pulses in the coil 184 to cause the stepping wheel 187 to advance four positions, thereby rotating the cylinder 189 to position the fourth reason "crane" in registry with the window on the control panel. Advantageously, the pulse generating transmitter element should be arranged so that it can be driven only in a single direction of rotation, preferably clockwise, so that it can be reset only by carrying it through a complete revolution, thereby causing the stepping wheel 187 to advance the cylinder 189 to its reset position. Further, it is desirable to provide either a detent on the shaft 179 for a governor to limit the speed with which the shaft can be rotated in order that well defined pulses are generated by the closing and opening of the contacts 182 whereby false or spurious pulses are avoided in the stepping coil 184.

Each of the transmitter and indicator combinations shown in FIGS. VI and VII require only a single wire plus the common wire of the system to extend between the work station and the central control station. Where desired a multi-position tap switch can be employed at the work station for the element 104 and a common wire connected to the displaceable contactor while individual wires from each of the taps on the switch are cabled to the central control station to form with the common wire a pair of conductors corresponding to each status of the machine to be indicated. Such a pair of conductors are thereby interconnected by the tap switch to complete a circuit actuating an indicator lamp individual to the message or a relay or the like whereby the completed circuit is translated to useful information.

The above description of the system is intended to be illustrative of the present invention. It should be understood that the invention lends itself to many improvements, modifications and adjuncts which can be incorporated without departing from its spirit and scope. Accordingly, this description should be read as illustrative and not as limiting the invention.

In recapitulation of this invention, a system is provided for monitoring the current status of a work station in a plant from a central supervisory and dispatching station while complete discretion as to the status assigned to a work station in the monitoring process and as to the record kept of that status is left with the dispatcher or supervisor at the central station. The personnel at the work station are continuously informed of the assigned status by means of visual signals and are enabled to communicate their conclusions regarding the status at the station and the needs of the station to the dispatcher or supervisor. Further, this communication is registered and maintained at the central station until it is responded to while means for alerting the personnel at that station are operated until some response is made. Visual registration of the time which has expired during the assignment of a work station to a given status, the number of manufacturing cycles performed at the station, and the remaining interval of assignment or the remaining number of cycles to be performed are continuously maintained at the central station by suitable registering devices. Simultaneously, a paper tape record in the form of multiple pen traces is kept on a time basis to indicate the number of manufacturing cycles and both the status of and reasons for the status of the work station.

Having described the invention, I claim:

1. A system for monitoring machine operations comprising a work station located in the vicinity of the machine to be monitored, a central station remote from said machine, first means responsive to each operating cycle of said machine for sensing a machine operating cycle, means at said central station responsive to said first means for registering sensed cycles, an indicator at each station responsive to said first means and operative in response to each sensed cycle of said machine, a production classification indicator at each station, a machine set-up classification indicator at each station, a machine down classification indicator at each station, means manually operative at said work station for selectively transmitting one of a plurality of predetermined messages, a message receiver at said central station which is controlled by said message transmitting means to issue a signal characteristic of the selected message, and manually operated means at said central station to indicate the classification assigned to said work station by selectively operating said classification indicators in a manner indicative of said classification.

2. A system for monitoring machine operations comprising a work station located in the vicinity of the machine to be monitored, a central station remote from said machine, first means responsive to each operating cycle of said machine for sensing discrete operating cycles of said machine, means responsive to said first means for recording said operating cycles and the elapsed time between cycles, an indicator at each station responsive to said first means and operative in response to each cycle of said machine, a production classification indicator at each station, a machine set-up classification indicator at each station, a machine down classification indicator at each station, means at said work station for generating signals indicative of conditions at said work station, a receiver at said central station responsive to signals from said signal generating means to indicate the work station conditions, means manually operative at said central station for selectively assigning said work station to a production, machine set-up, or machine down classification and for operating said classification indicator corresponding to said assigned classification, and means at said central station responsive to said assigning means for recording said assigned classification and said indicated condition at said work station.

3. A system for monitoring machine operations comprising a work station located in the vicinity of the machine to be monitored, a central station remote from said machine, first means responsive to each operating cycle of said machine for sensing discrete operating cycles of said machine, means at said central station responsive to said first means for recording said operating cycles on a time basis, means manually operative at said work station for indicating conditions at said work station, readout mechanism at said central station responsive to said manually operative means at said work station, manually operative means at said central station for selectively assigning said work station to a production classification selected from a plurality of predetermined production classifications, and means responsive to said assigning means for recording said assigned classification on a time basis.

4. A system for monitoring machine operations comprising a work station located in the vicinity of the machine to be monitored, a central station remote from said machine, manually operative means at said work station for indicating conditions at said work station, a readout mechanism at said central station responsive to said manually operative means at said work station, manually operative means at said central station for selectively assigning said work station to a selected one of a plurality of predetermined production classifications and means responsive to said assigning means for recording the assigned classification of said work station on a time basis.

5. A system for monitoring machine operations comprising a work station located in the vicinity of the machine to be monitored, a central station remote from said machine, a transmitter at said work station manually set to generate a signal selected from a plurality of signals characteristic of predetermined messages regarding conditions at said work station, means at said central station responsive to the signal from said transmitter for indicating the messages corresponding to the signals transmitted from said work station, a manually set means at said central station for selectively assigning said work station to a given production classification and in the case of at least one classification for selectively issuing a signal from a plurality of signals each indicative of a reason for said assignment, and means responsive to the signals issued by said central station assigning means for recording the assigned production classification of said work station and the reason for said assignment.

6. A system for monitoring machine operations comprising a work station located in the vicinity of the machine to be monitored, a central station remote from said machine, first means for sensing each operating cycle of said machine and issuing a signal characteristic of said cycle, means at said central station responsive to signals from said first means for recording sensed cycles, a message transmitter at said work station manually set to transmit a signal selected from a plurality of selectable signals characteristic of messages indicative of predetermined conditions at said work station, a message receiver at said central station responsive to signals from said message transmitter, a manually set, production classification assigning means for said work station at said central station for selectively issuing a signal characteristic of the set production classification and means to record the production classification assigned to said work station in response to the signal issued by said assigning means.

7. A system for monitoring machine operations comprising a work station located in the vicinity of the machine to be monitored, a central station remote from said machine, first means for sensing each operating cycle of said machine and issuing a signal characteristic of said cycle, means at said central station responsive to signals from said first means for recording sensed cycles, a message transmitter at said work station manually set to transmit a signal selected from a plurality of selectable signals characteristic of messages indicative of predetermined conditions at said work station, a message receiver at said central station responsive to signals from said message transmitter, a manually set, production classification assigning means for said work station at said central station, said assignment means being operative to states corresponding to the conditions represented by the messages transmitted from said work station, means responsive to the setting of said assigning means for generating electrical pulses in code groups characteristic of the conditions indicated by said assigning means and means responsive to pulses from said generating means to record said code groups.

8. A system for monitoring machine operations comprising a work station located in the vicinity of the machine to be monitored, a central station remote from said machine, a message transmitter at said work station selectively operative to transmit a message selected from a group of messages indicative of predetermined conditions at said work station, a message receiving means at said central station responsive to said message transmitter and operative to indicate the message selected at said transmitter, a manually set, production classification assigning means for said work station at said central station, said assignment means being operative to states corresponding to the conditions represented by the messages transmitted from said work station, means responsive to the setting of said assigning means for generating electrical pulses in code groups characteristic of the conditions indicated by said assigning means, and means responsive to pulses from said generating means to record said code groups.

9. A system for monitoring machine operations comprising a work station in the vicinity of the machine to be monitored, a central station remote from said work station, a selectively operative message transmitter at said work station for transmitting any selected one of a plurality of messages characteristic of predetermined conditions at said work station, a message receiving means at said central station responsive to said message transmitter and operative to indicate the message selected at said transmitter, means manually operative at said central station for assigning said work station to a predetermined production classification selected from a plurality of selectable production classifications and an indicator at said work station for indicating the production classification to which it is currently assigned.

10. A system for monitoring machine operations comprising a work station, a central station remote from said work station, a selector switch at said work station having a plurality of positions each corresponding to a predetermined message, a translator at said central station having an indicator responsive to the position of said selector switch to set forth the message corresponding to the switch position, an alarm at said central station and supplemental to said indicator responsive upon the displacement of said selector switch from a given position, means manually operative at said central station for assigning said work station to a production classification selected from a plurality of selectable production classifications, and an indicator at said work station responsive to said assigning means for indicating the production classification to which it is currently assigned.

11. A system for monitoring machine operations comprising a work station, a central station remote from said work station, a selector switch at said work station having a plurality of positions each corresponding to a predetermined message, a mechanical translator at said central station having an indicator responsive to the position of said selector switch to set forth the message corresponding to the switch position, an alarm at said central station and supplemental to said indicator responsive upon the displacement of said selector switch from a given position, means manually operative at said central station for assigning said work station to a production classification selected from a plurality of selectable production classifications, an indicator at said work station responsive to said assigning means for indicating the production classification to which it is currently assigned, means for sensing operating cycles at said work station and for issuing a signal in response to each operating cycle, and means at said central station responsive to signals from said sensing means for indicating each operating cycle.

12. A system for monitoring machine operations comprising a work station, a central station remote from said work station, a selector switch at said work station having a plurality of positions each corresponding to a predetermined message, a mechanical translator at said central station having an indicator responsive to the position of said selector switch to set forth the message corresponding to the switch position, an alarm at said central station and supplemental to said indicator responsive upon the displacement of said selector switch from a given position, means manually operative at said central station for assigning said work station to a production classification selected from a plurality of selectable production classifications, an indicator at said work station responsive to said assigning means for indicating the production classification to which it is currently assigned, means for sensing operating cycles at said work station and for issuing a signal in response to each operating cycle, means at said central station responsive to signals from said sensing means for indicating each operating cycle, and a register at said central station responsive to signals from said sensing means for registering sensed operating cycles.

References Cited by the Examiner
UNITED STATES PATENTS

| | | | |
|---|---|---|---|
| 1,713,276 | 5/1929 | Goeckler | 346—17 |
| 1,972,980 | 9/1934 | Dake | 346—34 |
| 2,126,025 | 8/1938 | Muehter | 346—34 |
| 2,519,925 | 8/1950 | Okuniew | 346—17 |
| 2,985,368 | 5/1961 | Kohler et al. | 340—332 X |

NEIL C. READ, *Primary Examiner.*

A. KASPER, P. XIARHOS, *Assistant Examiners.*